Feb. 4, 1941. C. E. MEYERHOEFER 2,230,891
ACTUATOR
Filed Oct. 7, 1938 2 Sheets-Sheet 2

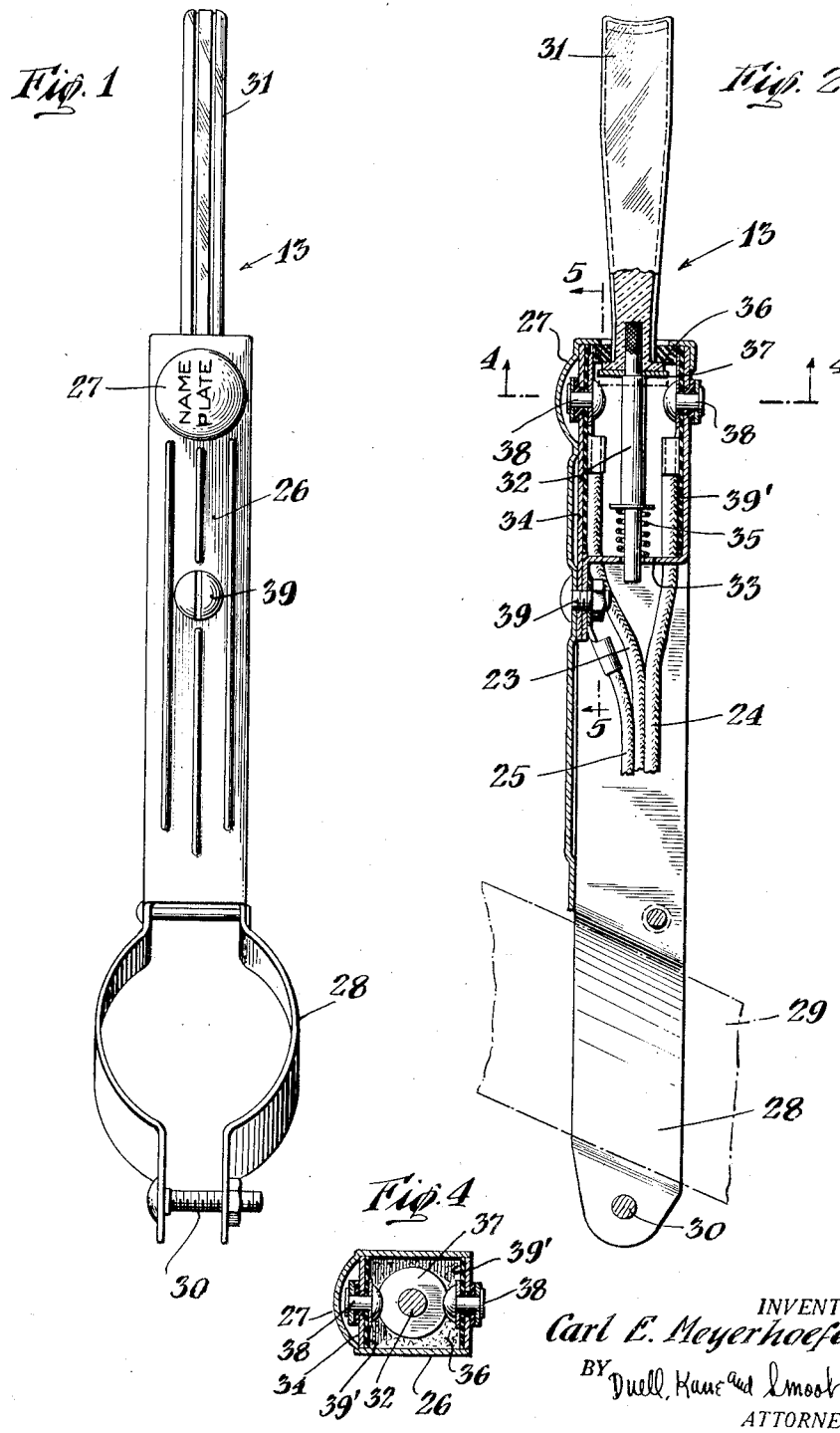

INVENTOR.
Carl E. Meyerhoefer
BY Duell, Kane and Smoot
ATTORNEYS.

Patented Feb. 4, 1941

2,230,891

UNITED STATES PATENT OFFICE 2,230,891

ACTUATOR

Carl E. Meyerhoefer, Brooklyn, N. Y., assignor to E. A. Laboratories, Inc., Brooklyn, N. Y., a corporation of New York Application October 7, 1938, Serial No. 233,765

2 Claims. (Cl. 200—6)

This invention relates to a structurally and functionally improved actuator capable of use in numerous different associations but primarily intended to be employed in association with warning signals such as automobile horns.

It is an object of the invention to provide a unit of this nature by means of which a pleasing and novel warning signal may be effected.

A further object is that of furnishing a unit of this type and by means of which, under the will of the operator, a selective and desired signal indication may be effected.

Another object is that of providing an actuator in the nature of an accessory for a motor vehicle and by means of which the foregoing results may be achieved, such actuator embodying a relatively simple and rugged structure embracing relatively few parts, each capable of quantity production and ready assemblage to provide a unit capable of being sold for a relatively nominal figure and operating over long periods of time with freedom from all difficulties.

With these and other objects in mind, reference is had to the attached sheets of drawings illustrating one practical embodiment of the invention and in which:

Fig. 1 is a front view of the actuator;

Fig. 2 is a sectional side view thereof;

Figure 6:
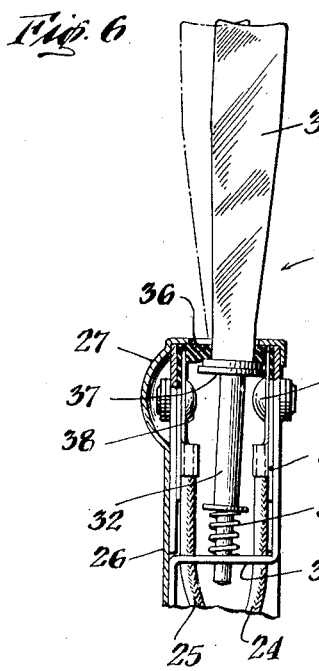
Figure 5:
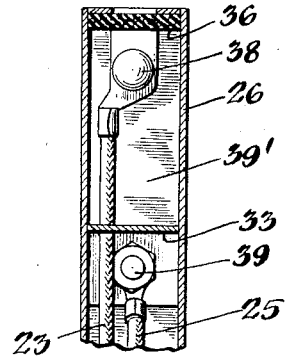

Figs. 4 and 5 are sectional views taken along the lines 4—4 and 5—5 and in the direction of the arrows as indicated in Fig. 2; and Fig. 6 is a fragmentary sectional view showing the parts within the upper portion of the actuator.

Figure 3:
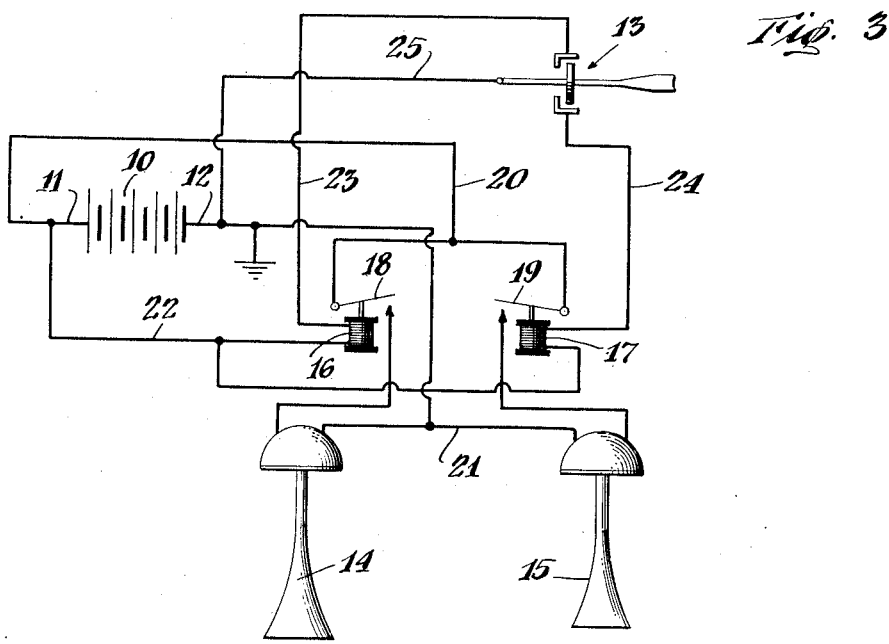
Fig. 3 shows diagrammatically the wiring circuit which is involved.

Referring primarily to Fig. 3, the reference numeral 10 indicates a source of electric current supply such as a storage battery and from which leads 11 and 12 extend. The actuator is generally indicated at 13 and the numerals 14 and 15 indicate respectively horns or sounding devices having different characteristics. These characteristics may, for example, be high and low intensity and/or the horns may be differently pitched. Relays 16 and 17 are also provided, these controlling circuit closers 18 and 19 respectively connected to one of the terminals of each of the sounding devices 14 and 15.

The circuit makers and breakers 18 and 19 are connected by a lead 20 to lead 11 and the second terminals of the sounding devices are connected by a lead 21 with lead 12. Finally, it will be observed that by a lead 22 one side of relays 16 and 17 are connected to lead 11 while the opposite sides of such relays are connected to leads 23 and 24 which extend to the actuator 13, the latter being coupled by lead 25 to lead 12.

Now referring to the details of the actuator, it will be observed as especially shown in Figs. 1 and 2, that it may include a metallic casing 26 conveniently having a bulged portion 27 upon which indicia may be displayed. This casing is coupled to, or formed with arms 28 which may encircle a member such as the steering column 29, and which may be constricted around this member as for example by a bolt and nut 30 in order to support the casing. Obviously, any other desired form of mounting may, however, be provided for the casing.

Extending beyond the outer end of the casing is a knob 31 of any desired configuration but preferably formed of a molded plastic. Imbedded within the inner end of this knob is a stem 32 which may be formed of brass or other suitable metal, and the end of which extends through an opening in a guide plate 33 conveniently formed of metal. This plate may be shaped so that in conjunction with a second plate 34 it forms within the casing 26 a subsidiary casing, and a spring 35 may be provided to normally urge stem 32 outwardly to the position shown in Figs. 1 and 2.

Outward movement of the handle and stem with respect to the casing is limited by, for example, disposing within the upper end of the casing a washer 36 conveniently formed of sponge rubber, which encircles the inner end of the knob 31 and is contactable with the inner face of the casing adjacent its outer end. At a point short of this washer or layer, stem 32 may carry a contact disk 37 formed of brass, and it is apparent by this construction, that knob 31 may be oscillated against the resistance offered by washer 36 and to some extent, by the spring 35. Also, the knob may be inwardly projected against the action of spring 35.

Tubular rivets 38 extend through openings in plates 33 and 34, a layer of insulation 39' of fiber, or other suitable material, being interposed between these parts to prevent any direct electrical connection between the rivets and casing. These rivets support the terminals of leads 23 and 24 and by means of a bolt 39, or otherwise, lead 25 may be secured to the subsidiary casing as shown in Fig. 5.

With the parts thus connected and again referring to Fig. 3, it is obvious that if knob 31 is rocked to the left as viewed in Fig. 2, the circuit through leads 23 and 25 will be closed by virtue of disk 37 contacting the left-hand rivet 38. This will result in relay 16 being closed to energize sounding device 14. Conversely, and as shown in Fig. 6, if the knob is rocked to the right, as viewed in these figures, the circuit will be closed through disk 37 between leads 25 and 24, and relay 17 will be actuated to cause an operation of sounding device 15. If knob 31 is pushed inwardly, disk 37 will simultaneously engage both rivets or contact members 38 to thus cause a simultaneous actuation of relays 16 and 17 and a corresponding operation of the sounding devices.

From the foregoing, it will be obvious that an actuator is furnished which, within the will of the operator, will act selectively to cause a functioning of sounding devices or corresponding elements. This may involve a sequential operation of unit 14 and then unit 15, or vice versa, and finally, if desired, a simultaneous actuation of both units. This sequence may, of course, be varied but in any event it will be understood that aside from the novel and pleasing effect produced, it will be feasible to, for example, cause merely a functioning of the low intensity or pitch unit, where traffic conditions call for such a signal indication, while the high intensity or pitch unit may be operated if a different type of signal is desired. Finally, where an extreme signal is to be employed, a simultaneous actuation of both units may be resorted to.

Thus among others, the several objects of the invention as specifically afore noted, are achieved. Obviously, numerous changes in construction and rearrangement of the parts might be resorted to without departing from the spirit of the invention as defined by the claims.

Having described my invention, what I claim as new and desire to secure by Letters Patent is:

1. A switch, including a hollow casing, formed with an end opening, a member extending across said casing and also formed with an opening, a handle extending through said end opening, a stem rigidly connected to said handle and extending through and in slidable contact with the edges of the member opening, a spring encircling said stem and connected to the same to normally urge the stem and handle outwardly with respect to said casing, means for limiting the outward movement of said stem and handle with respect to said casing, a contact member carried by said stem and handle, a pair of rigid contacts fixedly carried by the side walls of the casing and immediately adjacent said member, the distance between said contacts being less than the width of said contact member whereby said handle may be urged inwardly against the action of said spring to cause said contact member to simultaneously engage both of said pair of contacts and whereby said handle may, moreover, be rocked to cause said member to selectively engage with either of said pair of contacts.

2. A switch, including a hollow casing, formed with an end opening, a member extending across said casing and also formed with an opening, a handle extending through said end opening, a stem rigidly connected to said handle and extending through and in slidable contact with the edges of the member opening, a spring encircling said stem and connected to the same to normally urge the stem and handle outwardly with respect to said casing, means for limiting the outward movement of said stem and handle with respect to said casing, a contact member carried by said stem and handle, a pair of rigid contacts fixedly carried by the side walls of the casing and immediately adjacent said member, the distance between said contacts being less than the width of said contact member whereby said handle may be urged inwardly against the action of said spring to cause said contact member to simultaneously engage both of said pair of contacts and whereby said handle may, moreover, be rocked to cause said member to selectively engage with either of said pair of contacts and a resilient washer housed within said casing and co-acting with said handle and stem to return said handle to normal position after the same is rocked with respect to said casing.

CARL E. MEYERHOEFER.